May 11, 1937.  J. S. BELT  2,080,300
APPARATUS FOR PRODUCING CARBON DIOXIDE
Filed Oct. 19, 1932  10 Sheets-Sheet 1

Joseph S. Belt,
INVENTOR.
BY J. Stanley Bunch
ATTORNEY.

May 11, 1937.  J. S. BELT  2,080,300
APPARATUS FOR PRODUCING CARBON DIOXIDE
Filed Oct. 19, 1932  10 Sheets-Sheet 4

Joseph S. Belt,
INVENTOR.
BY J. Stanley Burch
ATTORNEY.

May 11, 1937.  J. S. BELT  2,080,300
APPARATUS FOR PRODUCING CARBON DIOXIDE
Filed Oct. 19, 1932    10 Sheets-Sheet 6

Joseph S. Belt,
INVENTOR.

BY J. Stanley Busch
ATTORNEY.

May 11, 1937.  J. S. BELT  2,080,300
APPARATUS FOR PRODUCING CARBON DIOXIDE
Filed Oct. 19, 1932    10 Sheets-Sheet 7
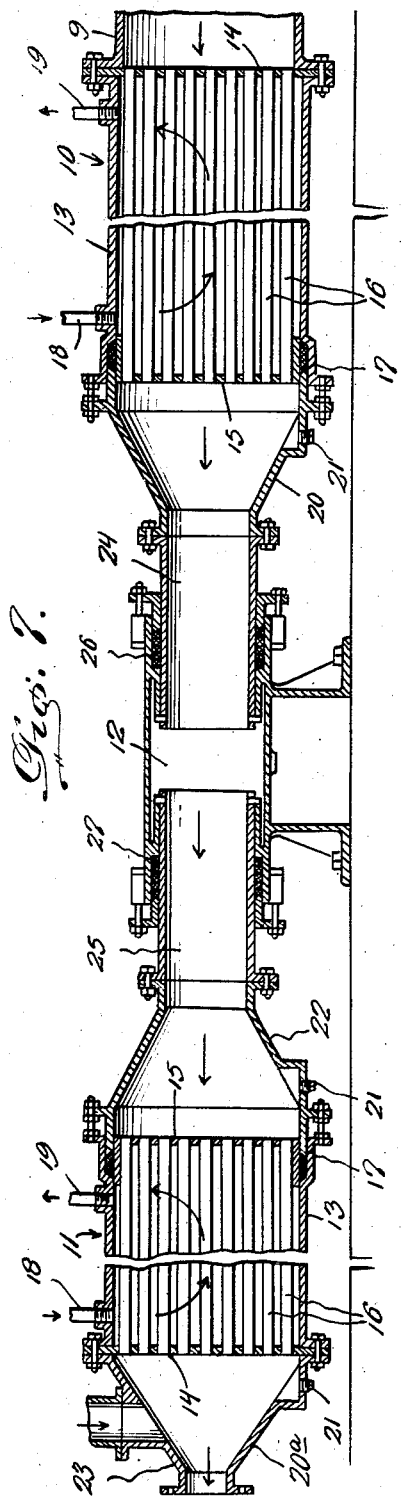
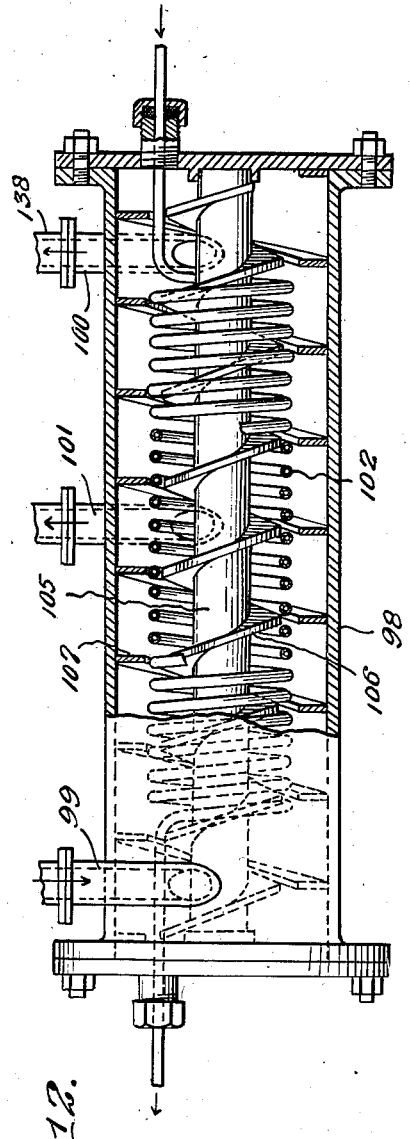
Joseph S. Belt,
INVENTOR.
BY J Stanley Burch
ATTORNEY.

May 11, 1937. J. S. BELT 2,080,300
APPARATUS FOR PRODUCING CARBON DIOXIDE
Filed Oct. 19, 1932 10 Sheets-Sheet 8
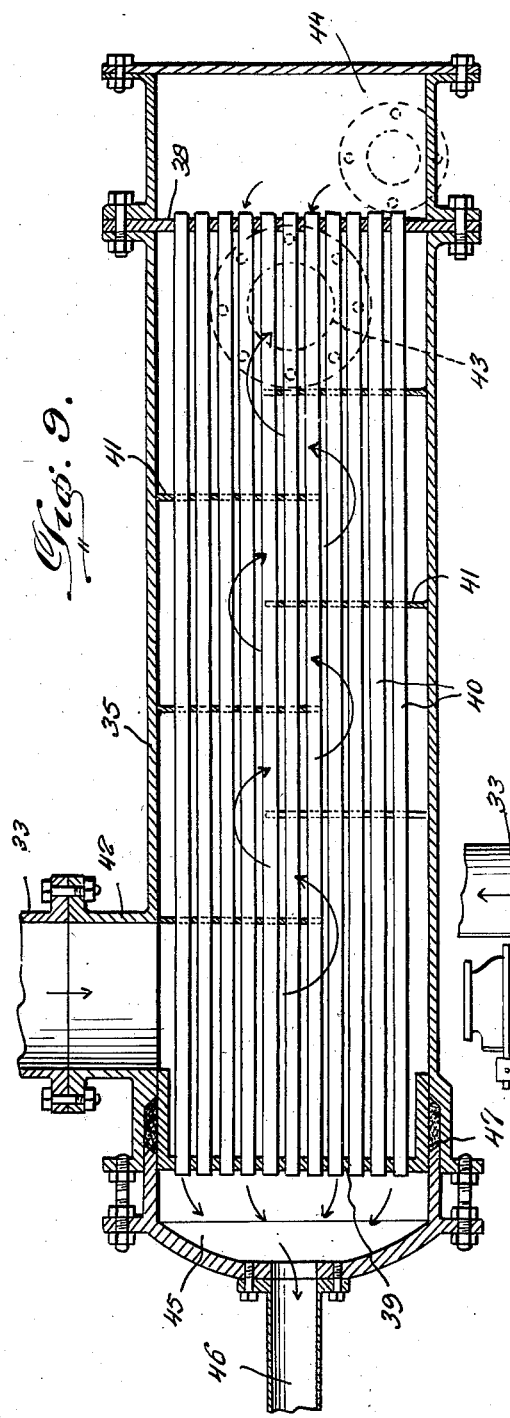
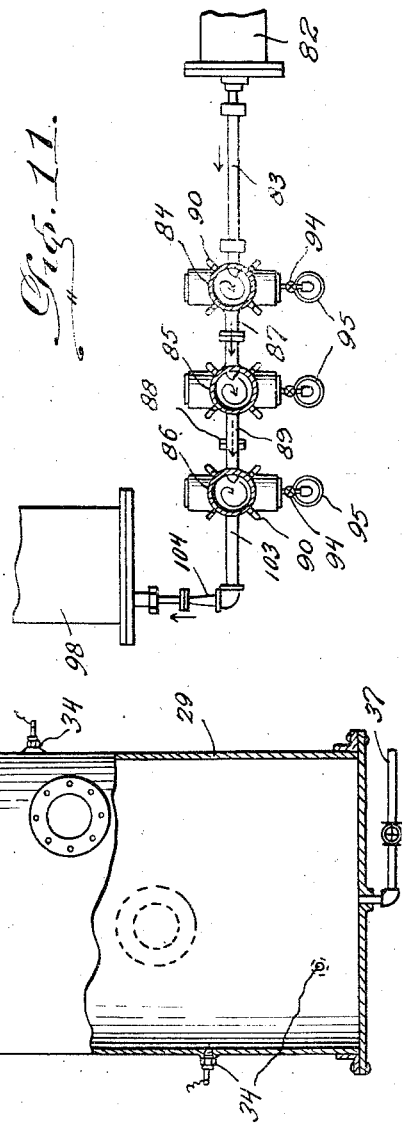
Joseph S. Belt,
INVENTOR.
BY J. Stanley Burch
ATTORNEY.

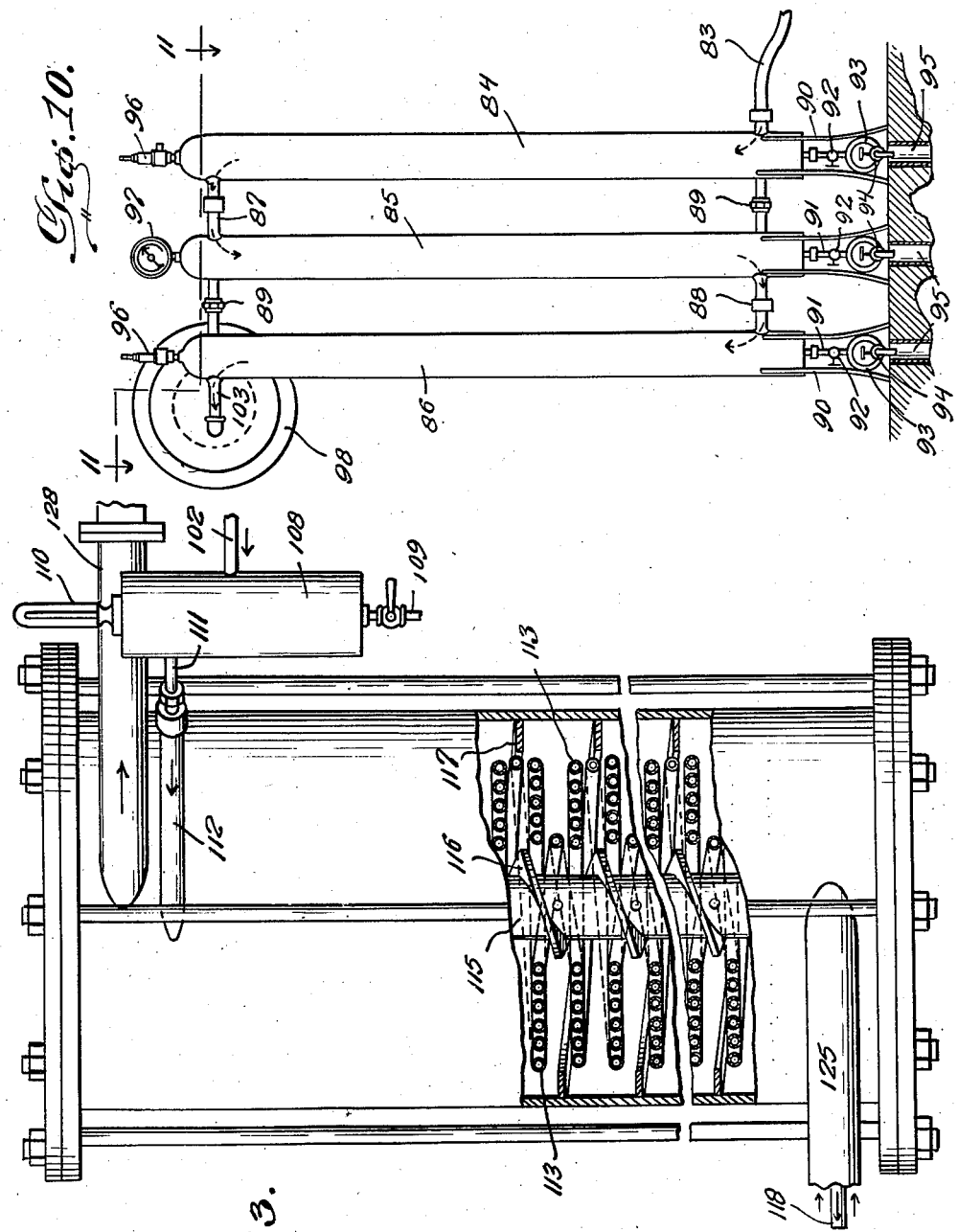

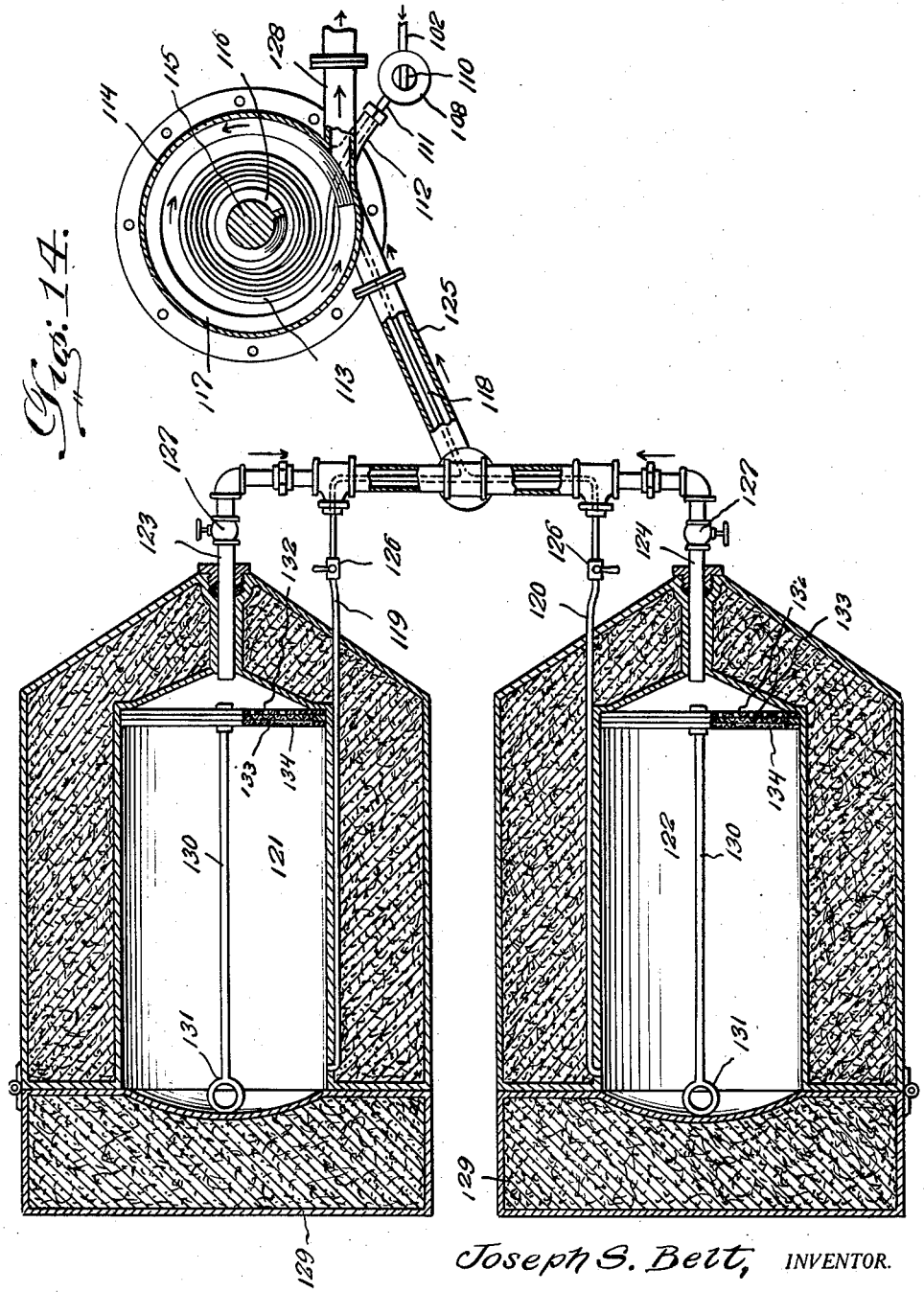

Patented May 11, 1937

2,080,300

UNITED STATES PATENT OFFICE 2,080,300

APPARATUS FOR PRODUCING CARBON DIOXIDE

Joseph S. Belt, Amarillo, Tex., assignor to J. S. Belt Natural Resource Corporation, Phoenix, Ariz.

Application October 19, 1932, Serial No. 638,647

5 Claims. (Cl. 62—121)

This invention relates to quantity production of solid carbon dioxide for commercial use as a refrigerant, and has more particular reference to the production of solid carbon dioxide for this purpose from flue gases occasioned by burning natural gas with air, and composed of about 10% carbon dioxide gas and 90% nitrogen.

More particularly, the present invention contemplates an improved process and apparatus by means of which the carbon dioxide may be effectively separated as a solid from the nitrogen by direct transition of the same from a gaseous to a solid state, which transition is effected mechanically rather than chemically, and without the aid of external or separate refrigeration.

It is known that by compressing, dehydrating and cooling flue gases, the carbon dioxide gas therein may be solidified and separated from the nitrogen thereof for use as a refrigerant. The present invention particularly contemplates improvements in this general process and in apparatus for practicing the same, whereby the solid carbon dioxide may be economically produced on a quantity basis and in a continuous manner.

A still further object is to provide an apparatus of the above kind which is safe and efficient in operation, as well as otherwise adapted to meet with all of the requirements for a successful commercial use.

Specific objects and features of the invention will become apparent from the following description when considered in connection with the accompanying drawings, in which:

Figure 7 is an enlarged central longitudinal section through the preliminary heat exchangers and the expansion joint therebetween, forming part of the plant shown in Figures 2 to 6 inclusive.

Figure 8 is a view of the gasometer which receives the flue gases from the preliminary heat exchangers, partly in elevation and partly in vertical section.

Figure 9 is an enlarged longitudinal sectional view of the heat exchanger for cooling the flue gases directly prior to compressing the same.

Figure 10 is a fragmentary elevational view, showing the device for dehydrating the flue gases immediately after being compressed.

Figure 11 is a horizontal section taken substantially upon line 11—11 of Figure 10.

Figure 12 is a view of the intermediate heat exchanger arranged between the dehydrater of Figure 10 and the final heat exchanger, partly in elevation and partly in longitudinal section.

Figure 13 is a view of the final heat exchanger and adjacent parts, partly in elevation and partly broken away and in section; and Figure 14 is a view of the expansion chambers and the final heat exchanger together with their connections, the expansion chambers and final heat exchanger being in horizontal section.

Figure 1:
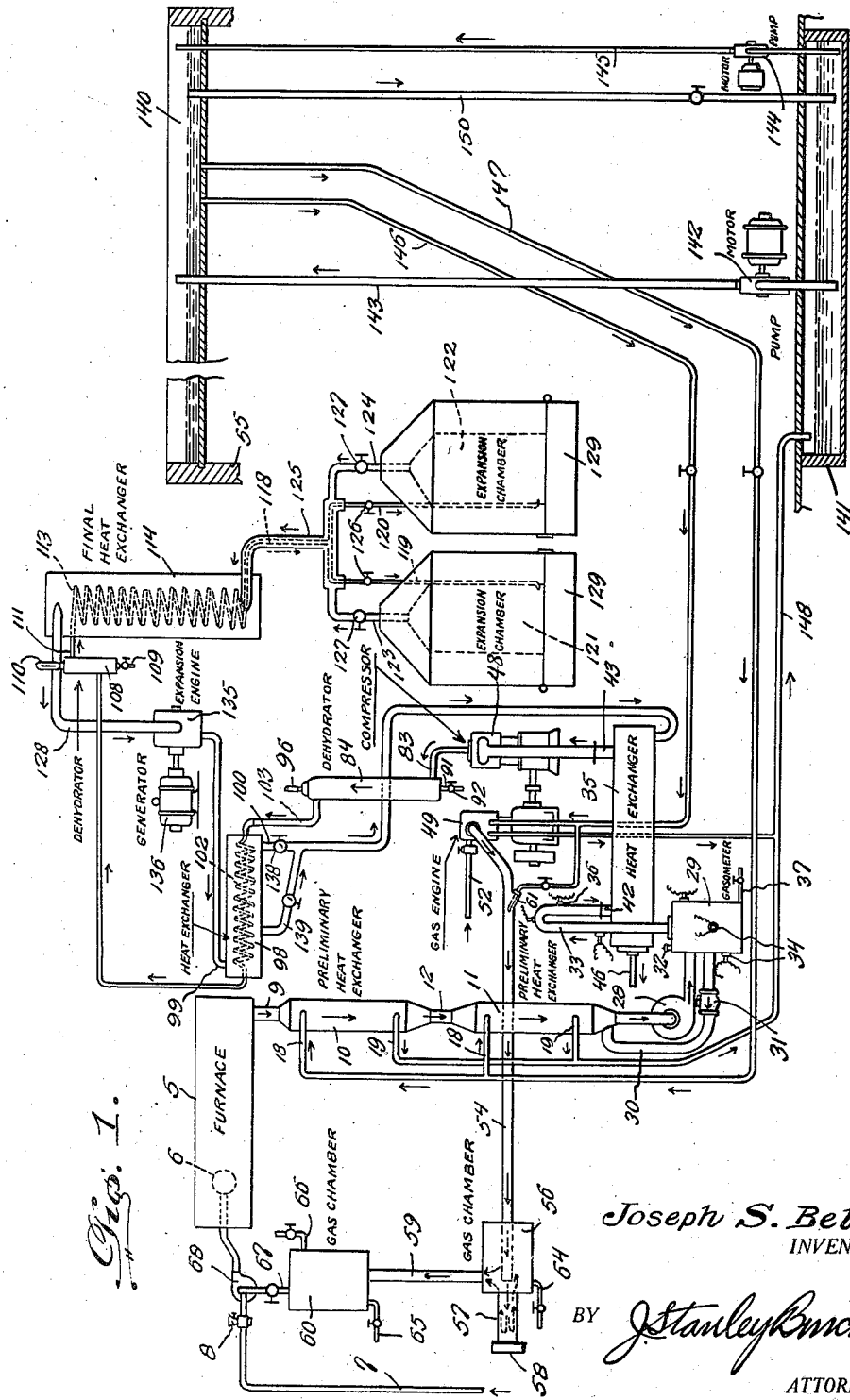
Figure 1 is a diagrammatic view, partly in plan, partly in elevation, and partly in section, of an apparatus for producing solid carbon dioxide in accordance with the present invention.

Referring in detail to the drawings, 5 indicates a furnace which has a burner 6 supplied by a pipe 7 with natural gas from a suitable source, and also supplied by means indicated at 8 with sufficient air to furnish the necessary oxygen for substantially complete combustion of the hydrocarbon constituents of the natural gas supplied by pipe 7 and for combustion of hydrocarbon constituents supplied from another source as will later be described. The furnace 5 has a stack 9 by means of which the flue gases or products of combustion are conducted from said furnace to a pair of preliminary coolers or heat exchangers 10 and 11 which are connected in series by means of an expansion joint 12. As shown clearly in Figure 7, heat exchanger 10 preferably consists of a shell 13 in which is arranged a fixed tube sheet 14 and a sliding or floating tube sheet 15, said tube sheets being connected by tubes 16. The fixed tube sheet 14 is bolted between the adjacent flanged ends of the shell 13 and the stack 9, while the outlet end of the shell 13 is constructed as at 17 to provide a stuffing box to seal the joint between the sliding tube sheet 15 and shell 13. Water is circulated about the tubes 16 between the sheets 14 and 15 for cooling the flue gases passing through the tubes 16, and for this purpose suitable pipe connections for the inlet and outlet of the cooling water to be circulated are provided as at 18 and 19. Obviously, the floating or slidable tube sheet 15 allows for expansion and contraction of the tubes 16, while the stuffing box or packing gland construction at 17 prevents leakage of the cooling water from the shell 13 outwardly past the periphery of floating tube sheet 15. The shell 13 has an outlet chamber 20 beyond the floating tube sheet 15. This outlet chamber is preferably of tapered form and provided with a suitable means 21 at the bottom for facilitating drainage of water therefrom such as results from condensation of vapor of combustion in the flue gases. Also, the shell 13 may, if desired, be provided with a top relief valve and a suitably closed bottom drain opening. The preliminary cooler or heat exchanger 11 is similar in construction to preliminary cooler or heat exchanger 10, except that it is reversed end for end and provided at its inlet end with a tapered inlet chamber 22, while its outlet chamber 20a has a lateral port 23 in addition to its axial outlet port, for a purpose which will presently become apparent. Other parts of heat exchanger 11 which correspond to similar parts of heat exchanger 10, are indicated by similar reference characters.

The adjacent smaller outer ends of the outlet chamber 20 of heat exchanger 10 and of the inlet chamber 22 of heat exchanger 11 are flanged for connection with the respective slidable members 24 and 25 of the expansion joint 12. This expansion joint is of a known double type consisting of a shell with the sliding members disposed in opposite ends thereof, the shell being provided with stuffing boxes 26 and 27 to provide fluid-tight joints between the shell and said slidable members. However, it will be understood that the heat exchangers 10 and 11 and expansion joint 12 may be varied in type or design without departing from the spirit of the invention. The purpose of the expansion joint is to permit ready expansion of the shells of heat exchangers 10 and 11 without detrimental results.

The outlet of heat exchanger 11 is connected to the inlet of a power driven blower or gas booster 28 which has its outlet connected with and arranged to discharge into a receiver or gasometer 29, whereby the flue gases are drawn from the furnace through stack 9 and heat exchangers 10 and 11, and then forced under low pressure into said receiver or gasometer 29. A by-pass connection 30 is also provided between the receiver or gasometer 29 and the outlet chamber 20a of heat exchanger 11, and arranged in this by-pass is a check valve 31 for preventing flow of gas from said outlet chamber 20a of heat exchanger 11 through by-pass 30 to receiver or gasometer 29, while freely opening under pressure to permit flow of the gas from receiver or gasometer 29 to the outlet chamber 20a of heat exchanger 11, back to the blower 28. The gasometer or receiver 29 is provided at the top with a suitable relief valve 32, and a relatively long vertical outlet stack 33. Carried by and arranged to constantly fire within the receiver or gasometer 29, are a plurality of spark plugs 34, arranged at various points about the circumference of said receiver or gasometer 29. The outlet stack 33 extends a considerable distance upwardly from the gasometer or receiver 29 and then extends downwardly for a considerable distance where it connects with the shell of an intermediate heat exchanger 35 which may be of the specific construction shown in Figure 9. As shown in Figures 1 to 6 inclusive, the outlet stack 33 is provided at suitable intervals with internal ultra-violet ray lights 36. The receiver or gasometer 29 also has a valve controlled bottom drain pipe 37, and the purpose of the latter, and of the spark plugs 34 and lights 36 will later become apparent.

Heat exchanger 35 may be of the general type exemplified by heat exchanger 10, consisting of a shell having a fixed tube sheet 38, a sliding or floating tube sheet 39, and tubes 40 connecting and opening through said tube sheet. Provided within the shell of this heat exchanger are suitable baffles 41 which cause the flue gas to take a zig-zag path and thereby flow in intimate relation with the tubes 40 in passing through the space between the tube sheets 38 and 39. The flue gases enter the shell of heat exchanger 35 through a top inlet port 42, and pass from the shell thereof through a lateral outlet port indicated by dotted lines at 43 in Figure 9. At the end of heat exchanger 35 adjacent the outlet 43 for the flue gases, such heat exchanger is provided with an inlet chamber 44 for the cooling medium. At the other end, heat exchanger 35 has an outlet chamber 45 to receive the cooling medium after passing through the tubes 40, and which has a central outlet pipe 46 through which the cooling medium passes. The outlet chamber 45 has an integral part forming part of the packing gland 47 for providing a fluid-tight joint between the shell of the heat exchanger and the floating tube sheet 39.

Figure 2:
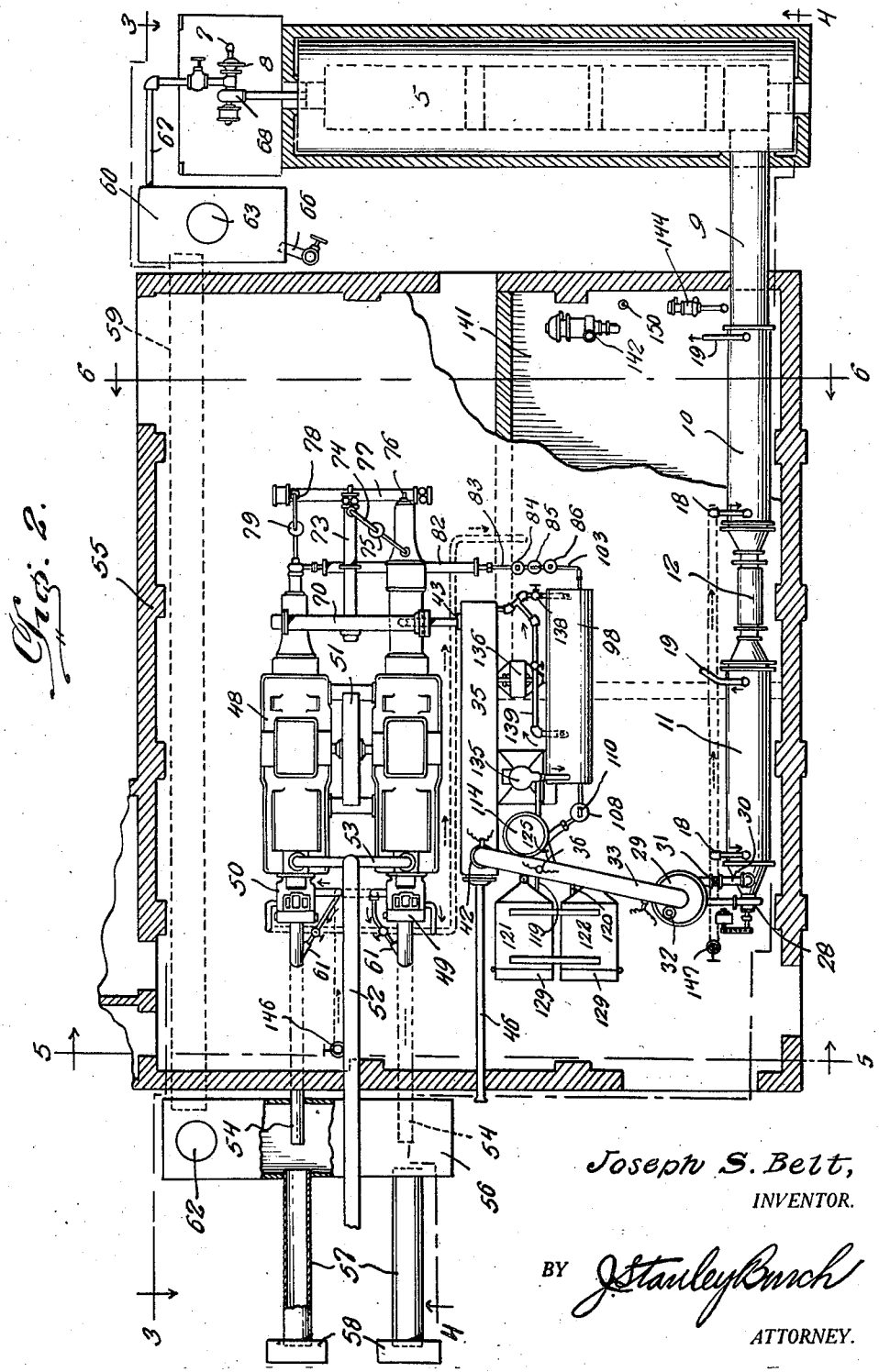
Figure 2 is a view of a plant embodying the apparatus of Figure 1, partly in plan and partly in horizontal section.
Figure 3:
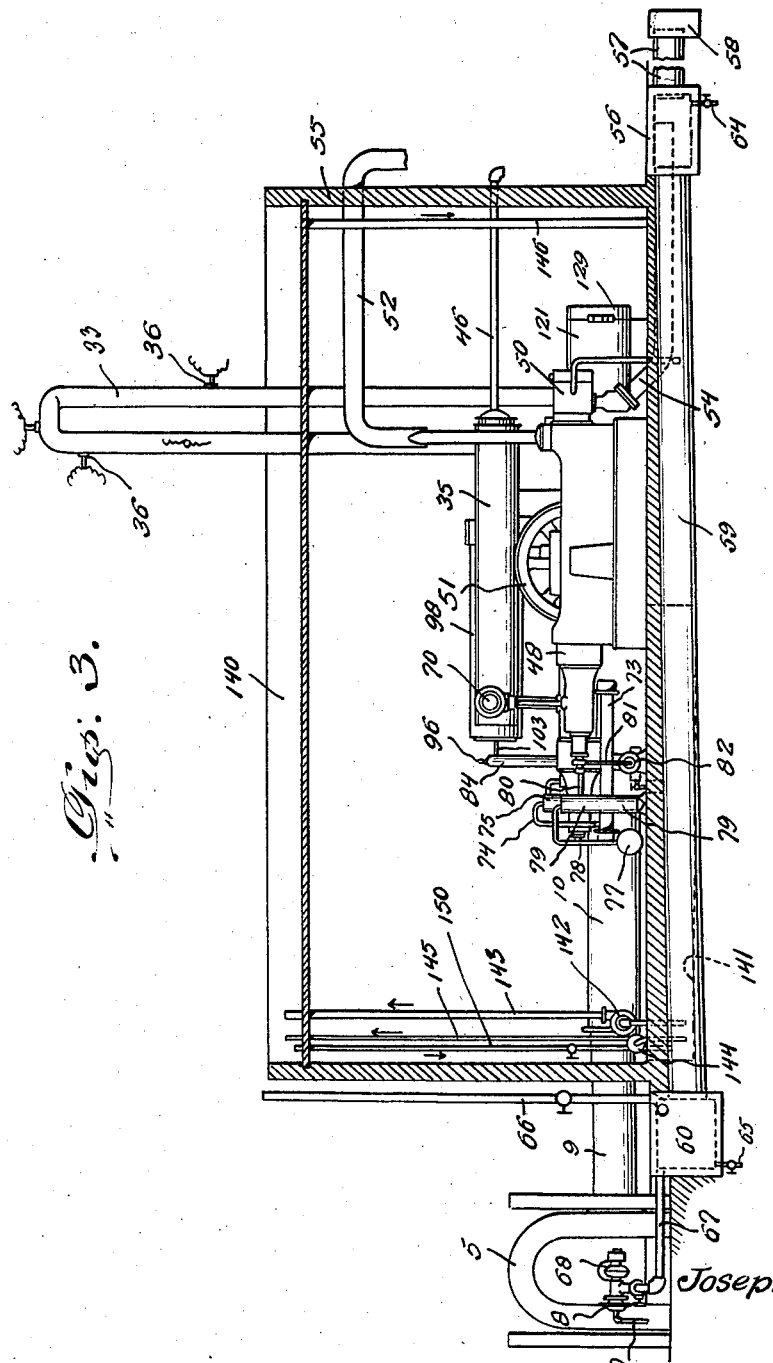
Figure 3 is a vertical longitudinal sectional view of the plant shown in Figure 2, taken substantially along line 3—3 of the latter figure.

The outlet 43 of heat exchanger 35 is connected to a conventional compressor 48 which is preferably of a duplex multi-stage type having four stages or compressor cylinders as indicated more clearly in Figure 2, the first and third stages of which are in tandem and operated by direct connection to a two-cycle internal combustion natural gas engine 49, and the second and fourth stages of which are in tandem and operated by direct connection to a further two-cycle internal combustion natural gas engine 50. The compressor thus consists in two units, each operated by an internal combustion engine, and both assembled upon a common foundation and having a common fly wheel 51. Compressors of this type have interconnections between the units for circulating cooling water, for lubrication, etc., and the units function as one compound machine. The engines 49 and 50 are provided with a common air intake pipe 52 connecting with a manifold 53, for supplying air for combustion of the natural gas supplied by suitable means to the respective engines. Each engine 49 and 50 is also provided with an exhaust pipe 54, and these exhaust pipes extend under ground to a point exteriorly of the building 55 which houses the major portion of the apparatus, where they enter and open into a gas chamber or receiver 56 embedded in the ground. Relatively large pipes 57 communicate with the chamber 56 directly opposite and in alinement with the exhaust pipes 54, and these pipes 57 are closed at their outer ends as at 58. It will thus be seen that the exhaust from pipes 54 discharges into the closed pipes 57 so that the shock or concussion of the exhaust is effectively cushioned and muffled. Extending from one end of the gas chamber 56 is a conduit 59 which opens into a second gas chamber 60. By this means, considerable heat is dissipated from the exhaust gas, and considerable water vapor is condensed and precipitated from the exhaust gas, while the pulsation of the exhaust is substantially relieved. As indicated generally at 61, means is provided to inject water into the exhaust pipes 54 for cooling the exhaust, and the water vapor mentioned above as being condensed and precipitated, is occasioned by the water so injected, as well as resulting from the combustion of gas and air in the engines 49 and 50. Gas chambers 56 and 60 may be provided with top manholes as at 62 and 63, and suitable facilities may be provided as indicated generally at 64 and 65 for draining the condensation from these gas chambers 56 and 60. Gas chamber 60 is further provided with a valve-controlled vent 66, so that the exhaust gases may be released therefrom if necessary or desirable.

Extending from gas chamber 60, is an outlet pipe 67 which, together with the gas supply pipe 7 communicates with the inlet of a power driven blower 68 which has its outlet connected to the burner 6. The exhaust gas thus flows in a quiet and even manner from gas chamber 60 through pipe 67, and is forced to the burner 6 by blower 68, along with unburned natural gas supplied by pipe 7, and outside air supplied by the means generally indicated at 8. Suitable means may be provided for regulating the flow of unburned gas, exhaust gas and air, whereby the same may be properly proportioned and mixed for combustion in the furnace 5. It will thus be seen that the flue gases from furnace 5 are derived by combustion of a quantity of unburned natural gas and air in such furnace, and byproducts of combustion from the engines 49 and 50 whose unburned hydrocarbon constituents are burned with air upon being supplied to the furnace. This provides for economical operation in view of the fact that a portion of the natural gas consumed for production of flue gases is utilized for power purposes and then more completely combusted along with additional unburned gas and air.

Passing from the heat exchanger 35, the flue gas enters the first stage cylinder of compressor 48 for compression to the proper degree, after which said flue gas is discharged through a pipe 69 (Figure 6) into an intercooler 70, wherein the heat of compression occurring in the first stage is removed to the temperature of the cooling water circulated in said intercooler. From intercooler 70, the partially compressed flue gases pass through a pipe 71 into the second stage cylinder of the compressor, wherein the flue gases are further compressed to the proper degree. The partially compressed flue gases are then discharged from the second stage cylinder through pipe 72 into a second intercooler 73, wherein the heat of compression of the second stage is removed to the temperature of the cooling water circulated in said intercooler 73. The compressed flue gases then pass through pipe 74 into a receiver 75, and then from receiver 75 into the third stage cylinder of the compressor, wherein the same are further compressed to the proper degree. The flue gases are thereafter discharged from the third stage cylinder of the compressor through pipe 76 into a still further intercooler 77, wherein the heat of compression occasioned in the third stage of compression is removed to the temperature of the circulating water therein. The flue gases then pass from intercooler 77 through pipe 78 into a receiver 79, and then through a pipe 80 (Figure 3) into the fourth stage cylinder of the compressor. The flue gases are then further compressed to the proper degree and final pressure within the fourth stage cylinder of the compressor, after which they pass therefrom through pipe 81 (Figure 3) into an after cooler 82, wherein the heat of compression occasioned in the fourth stage of compression is removed to the temperature of circulating cooling water therein. From the after cooler 82, the compressed flue gases pass through pipe 83 to a plurality of receivers 84, 85 and 86, connected in series as shown more clearly in Figures 10 and 11. It will be understood that intercoolers and after coolers are available in different types and designs of compressors, and intercoolers and after coolers of any suitable type or design may be employed in the present apparatus. However, the ones shown are of the shell and tube type for intercoolers, and of the emersed coil and shell type for the after cooler.

The receivers 84, 85 and 86 are high pressure cylinders arranged vertically and connected in series to receive and accumulate compressed flue gas from the compressor 48. This flue gas enters receiver 84 from pipe 83 at the bottom, passing upwardly therein and then through a connection 87 into receiver 85, then downwardly in receiver 85 through a connection 88 into the bottom of receiver 86, and then upward through the receiver 86. Braces are provided to rigidly connect the adjacent lower ends of receivers 84 and 85 and the adjacent upper ends of receivers 85 and 86. Suitable supports 90 are provided for the receivers 84, 85 and 86, while the said receivers have bottom outlet pipes 91 for water of condensation, provided with control valves 92 and opening into drip chambers 93. The drip chambers 93 are provided with drain valves 94, arranged to discharge in drain pipes 95. As shown clearly in Figure 11, the discharge end of pipe 83 entering the bottom of receiver 84, the discharge end of connection 87 entering the top of receiver 85, and the discharge end of connection 88 entering the bottom of receiver 86 are disposed tangentially of said receivers, respectively, so as to cause the flue gases to pass through the receivers with a whirling motion. This causes water of condensation to be thrown outward by centrifugal force against the side walls of the receivers so as to collect on said walls and more readily separate from the flue gases for drainage from the receivers by way of pipes 91, drip chambers 93 and drain valves 94. The separation of condensation from the flue gases is thus effected by the action of both centrifugal force and gravity. Pressure relief valves 96 may be provided in the tops of the receivers 84 and 86, while a pressure gauge 97 may be provided at the top of receiver 85.

Adjacent the heat exchanger 35 is a further intermediate heat exchanger 98 which may be of the type and construction illustrated in Figure 12, including a shell or casing provided at one end with an inlet 99 for a cooling medium, and provided at its other end and at a point intermediate its ends with outlets 100 and 101 respectively, for the cooling medium. This heat exchanger further includes a cooling coil 102 arranged within the shell or casing and preferably of helical form with its ends passing through the opposite ends of the shell or casing. The receiver 86, of the dehydrator composed of receivers 84, 85 and 86, has a top outlet pipe 103 connected by means including a reducing fitting 104 with the inlet end of the relatively smaller pipe forming the coil 102 of heat exchanger 98. In this way, the partially dehydrated and compressed flue gases are conducted from receiver 86 into and through the coil 102 of heat exchanger 98. The heat exchanger 98 may have an axial core 105 within the coil 102, and spiral ribs 106 and 107 may be provided respectively upon the core 105 and the inner surface of the casing or shell of heat exchanger 98 to cause spiral flow of the cooling medium into intimate relation with the convolutions of the coil 102. However, while this type and construction of heat exchanger is preferred, other types might be adopted without departing from the spirit of the invention.

The outlet end of coil 102 enters a small receiver 108 arranged near the adjacent end of heat exchanger 98, and this receiver 108 is provided with a bottom valve-controlled drain and vent pipe 109, a thermometer being provided at the top of the receiver 108 as at 110 to indicate the temperature of the compressed and partially cooled flue gases as they are discharged into the receiver 108 from heat exchanger 98.

The receiver 108 is provided with an outlet pipe 111 which is jacketed at 112, and which connects with the inlet of a coil 113 of a final heat exchanger 114. Heat exchanger 114 includes a shell within which the coil 113 is arranged, the coil 113 preferably comprising a series of spaced spiral portions connected in series, with the outer extremity of one spiral portion connecting with the outer extremity of the next adjacent spiral portion, and with the second spiral portion connected at its inner extremity with the inner extremity of the succeeding spiral portion, and so on. This heat exchanger 114 is vertically arranged and is preferably provided with a central core 115 arranged within the coil 113 and provided with a helical rib 116. The shell of heat exchanger 114 also preferably has an internal spiral rib 117 which cooperates with the rib 116 to cause the flue gases to follow a helical path in intimate relation with the spiral portions of the coil 113. As shown clearly in Figures 1 and 14, the outlet end of coil 113 connects with a pipe 118 having a pair of branches 119 and 120 opening respectively in expansion chambers 121 and 122, near the outer ends of the latter. Extending from the inner ends of the expansion chambers 121 and 122 are outlet pipes 123 and 124 in which the pipes 119 and 120 are partially encased, and which connect together and to a common discharge pipe 125 that surrounds the outlet pipe 118 of coil 113. In this way the cold unsolidified gas escaping from expansion chambers 121 and 122 is utilized to maintain the flue gases in a cold condition while passing from the coil 113 into the expansion chambers. The pipes 119 and 120 have control valves 126 to regulate the flow of cold flue gases into the expansion chambers, while the outlet pipes 123 and 124 are also provided with valves 127 to regulate the escape of gas from the expansion chambers so that a predetermined back pressure may be maintained within said expansion chambers. The pipe 125 connects with the bottom inlet of the shell of heat exchanger 114, the latter having a top outlet as at 128. In this way the cold escaping gases are utilized to cool the flue gases in the coil 113 prior to their expansion into the chambers 121 and 122, the flow of the escaping gases being countercurrent through the shell of heat exchanger 114, to the flow of gases through the coil 113.

Each expansion chamber consists of a heat insulated casing having one end open but normally closed by a heat insulated door 129. Arranged within each expansion chamber is a snow discharging and filtering device consisting of a piston slidably fitted in the expansion chamber and provided with an operating rod or handle 130 having an eye 131 at its outer end, the piston consisting of a perforated sheet metal plate 132, a screen 133, and a sheet of foraminous cloth 134. Upon opening the door 129 of either expansion chamber, a suitable tool may be engaged in the eye 131 to pull the associated piston and filtering device outwardly to discharge the accumulated snow from the associated expansion chamber, the passage of snow from said chamber through the outlet pipe 123 or 124 thereof being prevented by such piston. At the same time, the foraminous nature of said piston permits the desired passage of unsolidified gases from the expansion chamber by way of its outlet pipe 123 or 124. Obviously, the operation of one expansion chamber might be discontinued while its door 129 is opened and the accumulated snow discharged therefrom, by closing the associated valves 126 and 127, and vice versa. This will insure continuance of the snow forming process in one expansion chamber while snow is being discharged from the other.

Figure 4:
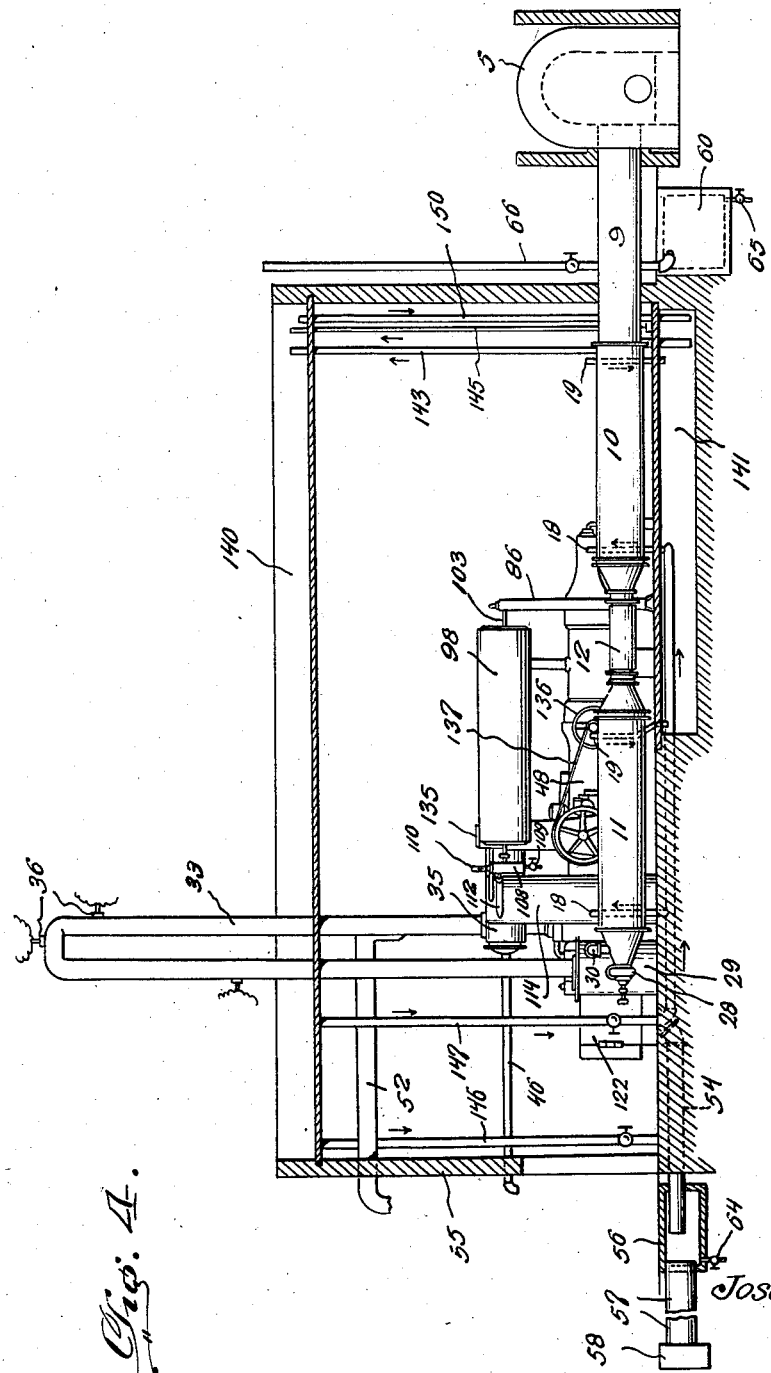
Figure 4 is a view similar to Figure 3 taken on line 4—4 of Figure 2.
Figure 5:
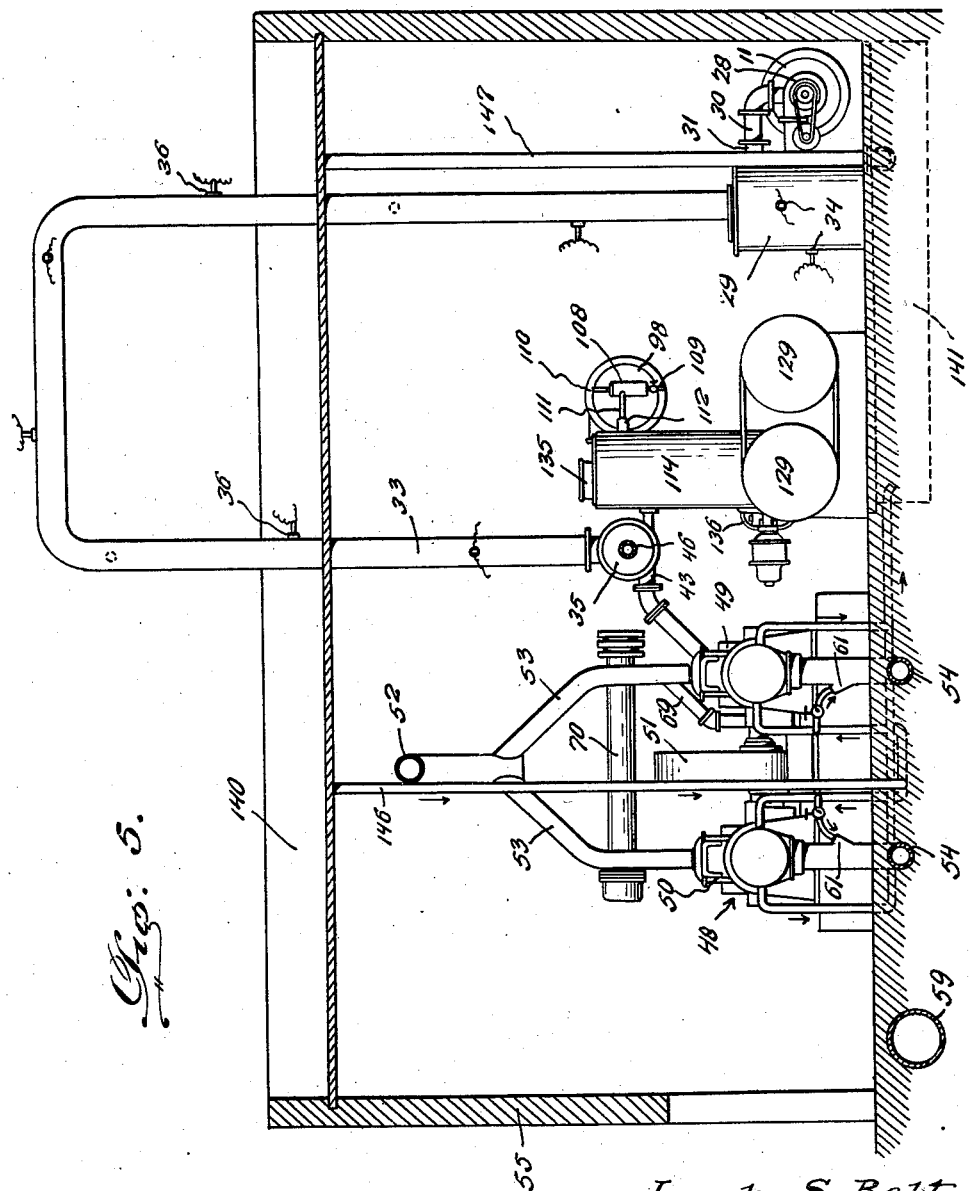
Figure 5 is a transverse vertical section on line 5—5 of Figure 2.
Figure 6:
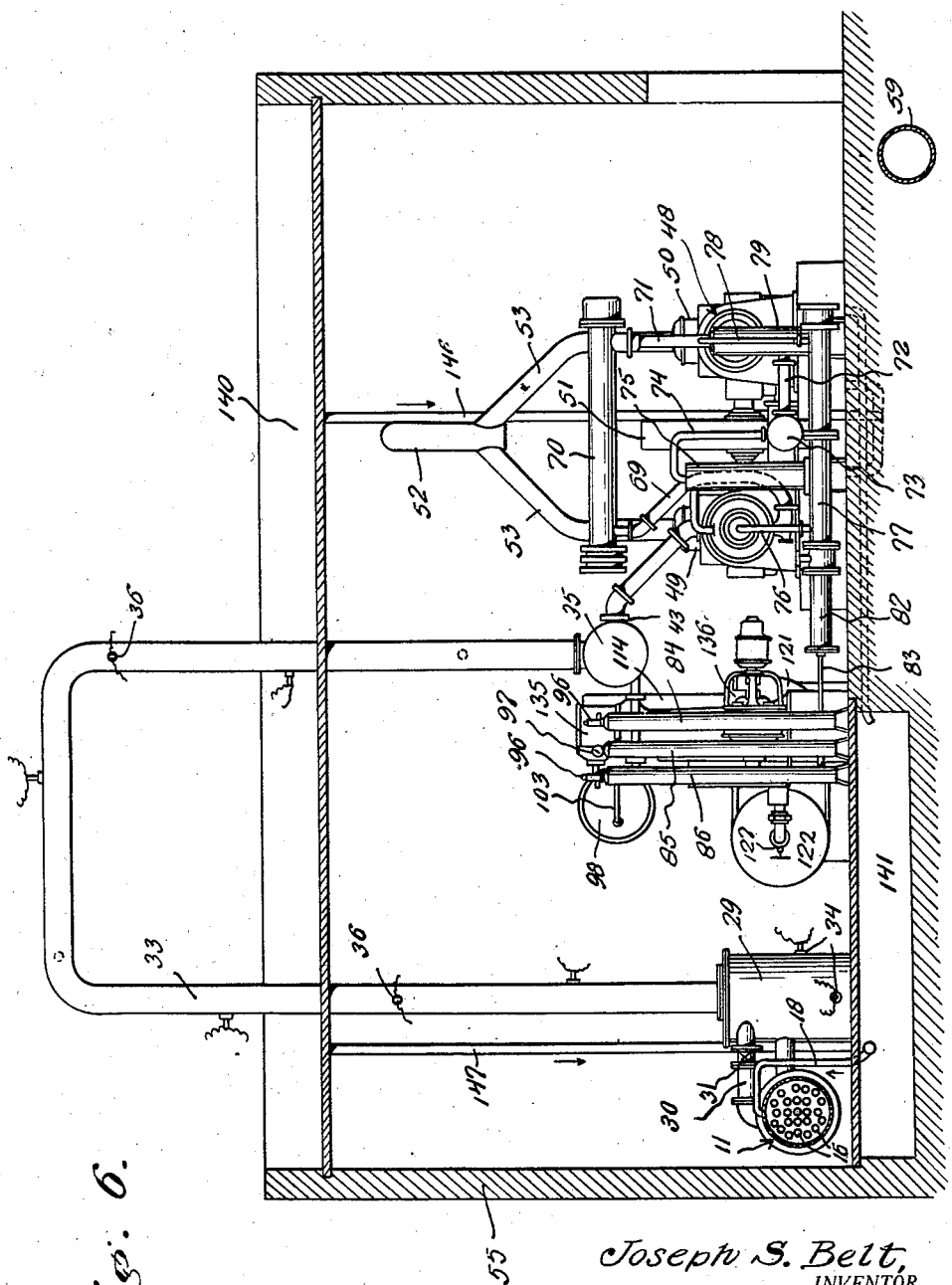
Figure 6 is a view similar to Figure 5 taken on line 6—6 of Figure 2.

The outlet 128 of the shell of heat exchanger 114 connects with the inlet of an expansion engine 135, used to drive an electrical generator 136 through the medium of a belt driving connection indicated generally at 137 in Figure 4.

The exhaust of expansion engine 135 connects with the cooling medium inlet 99 of intermediate heat exchanger 98. The cooling medium outlet 100 of heat exchanger 98 is connected by a valve-controlled pipe 138 with the inlet chamber 44 of heat exchanger 35, while the intermediate outlet 101 of heat exchanger 98 is connected by a valve controlled pipe 139 with the inlet chamber 44 of heat exchanger 35, also. As explained before, the cold gases pass from chamber 44 of heat exchanger 35 through the tubes 40 and pipe 46 to the atmosphere. The electricity provided by generator 136 may be used to drive certain pumps used in the apparatus as will be later described, and to provide current for lighting equipment used in the plant.

The roof of the building 55 may be constructed to provide a reservoir 140 to which cooling water used in the apparatus may be delivered for dissipation of heat therefrom, and constructed below the floor of the building at a suitable point is a collecting reservoir or sump 141 for such water. A motor-operated pump 142 is provided to discharge water from the sump 141 through a pipe 143 above and into the reservoir 140 so as to cool the water for re-use in the apparatus. A further motor-operated pump 144 may be provided to discharge the water from sump 141 through a pipe 145 to empty the sump 141 whenever the plant may be shut down. The reservoir 140 has an outlet pipe 146 downwardly through which the cold water may flow by gravity to the cooling jackets of engines 49 and 50 and to the devices 61 for injecting water into the exhaust pipes 54. Another pipe 147 is provided downwardly through which water may flow from reservoir 140 to the preliminary heat exchangers 10 and 11, by way of their inlet connections 18. The outlet connections 19 of heat exchangers 10 and 11, and the outlets of the cooling jackets of gas engines 49 and 50 may be connected with a pipe 148 by which the water is returned to the sump 141, to be subsequently elevated to the reservoir 140 by pump 142 and cooled for re-use.

In order that the operation of the apparatus may be clearly understood, it is pointed out that the compressor 48 functions upon 184 B. H. P. at 200 R. P. M. compressing 370 C. F. M. free gas at 60° F. and 1 atm. intake conditions delivered at 3000# gauge, requiring fuel of 11 cu. ft. of 1000 B. t. u. natural gas per B. H. P. hour or 11,000 B. t. u. per B. H. P. Per 24 hr. day, the B. t. u. requirement is 48,576,000; per hour the B. t. u. requirement is 2,024,000; and per minute the B. t. u. requirement is 33,733.3. This constitutes respectively 48,576 cu. ft. of natural gas per 24 hr. day; 2,024 cu. ft. per hr.; and 33.73 cu. ft. per minute. Since the constituency of natural gas varies, for the purpose of tracing a cycle through the apparatus, we will assume a natural gas consisting as follows:

| | | Per cent |
|---|---|---|
| Methane | (CH₄) | 75.00 |
| Ethane | (C₂H₆) | 13.78 |
| Nitrogen | (N₂) etc. | 11.22 |
| | | 100.00 |

The above, in fuel value, possesses 1000 B. t. u. per cu. ft., and is burned with 5% excess air in the engines of the compressor. All gases and vapors are calculated at 60° F. and 30" pressure, and the combustion equations of the above hydrocarbons are as follows:

$$CH_4 + 2O_2 = CO_2 + 2H_2O$$

$$C_2H_6 + 3\tfrac{1}{2}O_2 = 2CO_2 + 3H_2O$$

It will thus be obvious that from each cu. ft. of methane ($CH_4$), on complete combustion, one cu. ft. of $CO_2$ and two cu. ft. of $H_2O$ results, while from each cu. ft. of ethane ($C_2H_6$), upon complete combustion, two cu. ft. of $CO_2$ and three cu. ft. of $H_2O$ results. Thus, in one cu. ft. of the above fuel gas, 75% thereof will be methane ($CH_4$), 13.78% thereof will be ethane ($C_2H_6$), and 11.22% thereof will be inerts, which we will consider as nitrogen ($N_2$) because nitrogen constitutes the greater portion thereof.

The amount of air required to burn 1 cu. ft. of methane ($CH_4$) is 9.570; the amount of air required to combust 1 cu. ft. of ethane ($C_2H_6$) is 16.748; and combustion with 5% excess air requires 10.048 cu. ft. of air per cu. ft. of methane and 17.585 cu. ft. of air per cu. ft. of ethane. Accordingly to combust 1 cu. ft. of the above natural gas will require

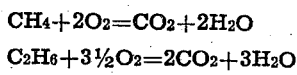

or 9.9595 cu. ft. of air. Accordingly, the initial volume of 1 cu. ft. of the gas plus 9.9595 cu. ft. of air will equal 10.9595 cu. ft. before combustion, and, upon combustion, the products of combustion will be $CO_2$, 1.0256 cu. ft.; $H_2O$, 1.9134 cu. ft. and $N_2$ etc., 8.0205 cu. ft. The total products of combustion are thus the equivalent of the mixture before combustion, or 10.9595 cu. ft. The B. t. u. of combustion is likewise 1000.

In view of the above, operation of the plant for a 24 hr. day will result in the consumption of 48,576 cu. ft. of natural gas in mixture with 483,792.72 cu. ft. of air, making a total volume of gas-air mixture prior to combustion of 532,368.72 cu. ft. Upon combustion of this total volume, a like volume will result consisting in the following products of combustion: $CO_2$, 49,819.54 cu. ft.; $H_2O$, 92,945.31 cu. ft.; and $N_2$ etc., 389,603.80 cu. ft. With the water vapor of combustion ($H_2O$) condensed out, the remaining dry gaseous volume will be $CO_2$, 49,819.54 cu. ft., $N_2$ etc., 389,603.80 cu. ft., or a total gaseous volume of 439,423.34 cu. ft. This is by volume 11.31% $CO_2$, and the condensed water vapor will be 531.0 gallons. With the compressor actually delivering 370 cu. ft. of free gas per minute compressed to 3000# gauge, the per diem delivery of the compressor will be 532,800 cu. ft., and, since from the internal combustion engine is obtained only 439,423.34 cu. ft. of combustion gases, it is therefore necessary to burn additional natural gas in the furnace, which, when burned and the water vapor condensed out will aggregate a volume of 532,800 cu. ft. when added to the gases above at 60° F. and 30" pressure. This will require the burning of 10,322.31 cu. ft. of natural gas in the furnace, burned with 5% excess air. The latter gives the following products of combustion: $CO_2$, 10,586.46 cu. ft.; $H_2O$, 19,750.70 cu. ft.; and $N_2$ etc. 82,790 cu. ft. Condensing out the $H_2O$ in the amount of 115.87 gallons of water, leaves a volume of dry flue gas of 93,376.6 cu. ft. Accordingly, the gases of combustion from the engines in the amount of 439,423.34 cu. ft., plus gases of combustion in the furnace in the amount of 93,376.6 cu. ft., provides a total volume of gases of combustion of 532,800 cu. ft., which the compressor will handle per 24 hr. day. This total volume of gases will result in deriving water of combustion in the amount of 647.17 gallons.

It is common practice to inject cooling water into exhaust pipes of internal combustion engines of the type indicated at 49 and 50 as indicated at 61, to cool the exhaust gases of combustion. Assuming the cooling water is at 70° F., the injection of 65 gallons of water per minute into these exhaust pipes will cool the gas to or to about 80° F., at which temperature it may be drawn off from gas chamber 60. This exhaust gas not being permitted to accumulate so that a pressure is built up by being withdrawn from gas chamber 60 and passed into the furnace as rapidly as it is provided, the pressure thereof is maintained at approximately 1 atm. While there will be no steam from the water produced by the combustion and the water injected into the exhaust pipes at 80° F., the exhaust gases of combustion will, however, be at its maximum saturation at the temperature and pressure stated. Accordingly, this temperature and saturation must be taken into consideration in deciding upon the size of the pipe 67 and the size of the blower 68, as well as in proportioning the exhaust gas, air and natural gas which are taken into the blower 68 and mixed for combustion in the furnace. This, however, may be readily determined in view of the fact that the respective temperatures of the exhaust gas, air and natural gas being mixed are known.

Upon recombustion in the furnace with additional natural gas and air, 5% excess air is used with the exhaust gases from the engines. The flue or stack gases passing from the furnace through flue or stack 9 will be properly cooled in heat exchangers 10 and 11 without the circulation of a great amount of cooling water through said heat exchangers if the latter are properly constructed as to size, etc. Assuming that the cooling water is at 70° F., circulation of the same through the shells of heat exchangers 10 and 11 at the rate of about 30 gallons per minute will cause the flue gases to be cooled to 80° F., or less. Much of the water of combustion will therefore condense out of the flue gases when traveling from the stack or flue 9 to the blower or booster 28, which condensation may be readily drained off from the condensers 10 and 11 at 21.

The exhaust gases of combustion from the engines 49 and 50 are thoroughly scrubbed by injection of the cooling water into the exhaust pipes as indicated at 61. Then, at its maximum saturation of 80° F. and 1 atm. pressure, the exhaust gases of combustion are conducted into the furnace for recombustion with additional natural gas, and the water in saturation thereof, added to the water of combustion of the natural gas, effects a substantial scrubbing of this additional volume of gases of combustion occasioned in the furnace. Practice has shown that the gases of combustion thus availed of are more satisfactorily scrubbed than by any other arrangement for the purpose.

In the receiver or gasometer 29, the spark plugs 34 are kept constantly firing in order that any combustible matter entering therein may be ignited, thus preventing the possibility of the same passing through and igniting under pressure and the heat of compression in the cylinders of compressor 48. The blower or gas booster 28 has a pressure capacity of about four ounces, and the check valve 31 in by-pass 30 is adapted to open at approximately a pressure of 3 oz. Accordingly, this check valve provides for the booster building ahead of it a 3 oz. pressure, and if the pressure rises, the check valve 31 opens and permits the stack gas in the gasometer to by-pass back to outlet chamber 20a of heat exchanger 11 for return to the blower or booster 28. Therefore, the blower or booster 28 cannot, by building pressure ahead of the same, reach its maximum delivery point and thereby occasion a state of nondelivery, which would otherwise occur.

It is obviously impractical to operate the blower or booster 28 with an exact displacement as that of the compressor 48, and to keep them functioning exactly in displacement unison. Accordingly, the capacity of the blower or booster 28 is provided considerably in excess of the capacity of the compressor, and there is accordingly a constant by-passing of stack gas from the gasometer 29 to the outlet chamber 20a of heat exchanger 11, and then through the blower or booster 28 back to the gasometer, the induced draft of flue gases from the furnace through the heat exchangers 10 and 11 being kept at a constant. Since the pressure in the gasometer 29 is not more than 3 oz., ignition of any combustible matter entering therein from the furnace, due to any momentary incomplete combustion in the latter, will not be of great force, and, upon ignition, the pressure or concussion thereof is relieved through relief valve 32 at the top of gasometer 29 and through check valve 31. This is a facility that should not, under any circumstances be omitted. Constant sparking of the stack gases in the gasometer 29 also effects to some extent an ionization of the entrained water vapor or saturation of the gas. As is known, ionization is an electrolytic process whereby particles of a gas become carriers of electricity, and the hydrogen ions form nuclei for the formation of droplets of water. Further on in the apparatus, these also form nuclei for the formation of particles of solid carbon dioxide, and the ionization is of importance and conducive to efficiency of the apparatus. The ultra violet ray lights are provided internally of the outlet stack 33 of gasometer 29 as at 36, for further ionization of the stack gases with water in saturation as it passes therethrough. It will be understood that spark plugs may be substituted for the ultra violet ray lights to serve the same purpose. The stack pipe 33 also rises to a height of at least 33 ft., which is conducive to dehydration.

The stack or flue gases pass from outlet stack 33 through heat exchanger 35 so as to be cooled to about 60° F. immediately prior to entering the compressor 48. Entering the compressor at about 60° F. and under about 3 ounces pressure, the flue gases are compressed and partially dehydrated in four successive stages as previously described, supply of the flue gases to the compressor under about 3 ounces pressure greatly facilitating the performance of the compressor. Since the stack or flue gases are to be compressed to 3000# gauge, the ratio of compression for each compressor cylinder or each stage of compression is 3.8, and the heat of compression in each stage is substantially 260° F. The circulation of cooling water at 70° F. in the intercoolers and aftercooler to remove the heat of compression of each stage, respectively, will be approximately 15 G. P. M. for each cooler, or a total circulation of water in the amount of 60 G. P. M. This cools the gas being compressed between stages to 80° F., and delivers it from the aftercooler at 3000# gauge and 80° F.

The receiver or dehydrator 75, which is merely a suitable large cylinder through which the gases being compressed pass from the second stage intercooler 73 to the third stage of compression, has a particular purpose. Under compression, the volume of a gas varies inversely to the pressure to which it is subjected, and the saturation increases proportionately to the volumetric variation of the gas compressed. In other words, if a cu. ft. of gas is 100% saturated and, from compression, is reduced in volume to one-half cu. ft., the saturation is then 200% because the same moisture content originally entrained in one cu. ft. of gas is then entrained in one-half cu. ft. of gas. It is therefore apparent that the receiver or dehydrator 75 is advantageously used at this point in the apparatus to facilitate removal of much of the moisture content of the partially compressed flue gases.

With actual compressor performance of 370 cu. ft. per minute displacement of free gas at 60° F. and 1 atm. intake conditions, the same will reduce in volume from the first stage of compression to 95.87 cu. ft. which inversely increases the saturation thereof and, being cooled to 80° F. in the first stage intercooler enroute to the second stage of compression, much of the water in saturation condenses out in the first intercooler. In other words, the original volume of 370 C. F. M. of free gas taken into the compressor is by volume 3.8 greater than it is after passing through the first stage of compression and, the saturation thereof consequently becomes 3.8 times what it originally was, which conduces to condensation of the water originally in saturation, upon cooling in the intercooler. In the second stage of compression, this volume is further reduced upon the same ratio of 3.8 to 25.23 cu. ft., and the saturation thereof upon entering the second stage is increased 3.8 times because of the diminution in volume from compression. Further condensation of moisture in saturation takes place, precipitating out in the second stage intercooler. However, in order to here facilitate dehydration, the receiver 75 is provided as stated above. Assuming receiver 75 has an internal area of 4.3 cu. ft., the gas from the second stage of compression passing from the second stage intercooler will remain therein for approximately 10 seconds, thus facilitating dehydration by slowing the velocity with area, and affording time for the gas to cool to 80° F. in the second stage intercooler to drop its moisture in said receiver 75.

In the third stage of compression, the volume is further reduced upon a like compression ratio of 3.8, and its volume becomes 6.64 cu. ft. while the remaining saturation thereof upon entering the third stage is increased 3.8 times, conducing to further condensation and precipitation of entrained water vapor. Passing through the third stage intercooler, the volume of flue gas is cooled to 80° F. and water in saturation is condensed for removal in receiver 79, which is similar to receiver 75. However, because of the reduced volume of the flue gases, the gas will remain in receiver 79 approximately 38 seconds because of retarded velocity, whereby dehydration by condensation is further and greatly facilitated in such receiver 79.

In the fourth stage of compression, the volume is further reduced upon a like ratio of compression of 3.8 and becomes by volume 1.8 cu. ft. Here, again, the saturation upon entering the fourth stage is increased 3.8 times and again, further condensation and precipitation takes place upon passing through the after cooler in which the volume is cooled to 80° F. Dehydration is then continued in receivers 84, 85 and 86.

To facilitate any further possible dehydration in receivers 84, 85 and 86, the gas is caused to spiral or whirl therein, whereby any remaining saturation will be brought in contact with the inner circumferences of said receivers 84, 85 and 86 by the action of centrifugal force, to subsequently settle out by gravity.

Receivers 84, 85 and 86 also have other functions. Relief valves 96 are provided on receivers 84 and 86 in addition to providing relief valves between the successive stages of compression, so that high pressure gas cannot leak back into low pressure stages because of worn or defective pistons, rings, etc. Two relief valves are advisable as a safety measure in the event one should fail to function. Further, since the compressor operates at 200 R. P. M., the compressed gases discharge from the fourth stage in pulsations of 200 per minute into the receivers 84, 85 and 86. These receivers cushion and dispense with these pulsations, thus providing a quiet even flow of the compressed volume from receiver 86. Without these receivers, the pressure would not be steady and constant, but would pulsate through the apparatus to the point of expansion and impede the economy and efficiency of the entire apparatus. In operation, the valves 92 of the receivers 84, 85 and 86 are left open and, as water accumulates in drip pockets or chambers 93, the compressed gas therein is displaced upward into the receivers 84, 85 and 86. To drain the drip chambers 93, the valves 92 are closed, and valves 94 are opened, compressed gas in the drip chambers 93 forcing the condensed water therefrom into drain pipes 95, which may conduct such water to the sump 141.

From receiver 86, the compressed flue gases in substantially a dehydrated state pass to heat exchanger 98 by way of pipe 103 and reducing fitting 104. This reducing fitting has a very gradual taper. Accordingly, the discharge of compressed gas from receiver 86 into heat exchanger 98 under a free flow is facilitated. After passing through the coil of heat exchanger 98, the compressed flue gases enter receiver 108, wherein any remaining water in the flue gases may be removed by opening valve 109. The latter valve may also be opened to relieve pressure throughout the entire system or cycle. This provides a facility by which direct delivery of compressed gas from the compressor may be had for any purpose desired.

The dehydrated and compressed flue gases then pass through final heat exchanger 114 for final cooling immediately prior to discharge through pipes 119 and 120 into expansion chambers 121 and 122. The flue gas is expanded from 3000# to 150# in the expansion chambers 121 and 122, cooling from the Joule-Thompson effect and regenerative action. By regeneration, is meant the continuous passing back of cold gases of expansion from expansion chambers 121 and 122 around the coil of heat exchanger 114 through which pass the compressed gas for expansion, the cold gases of expansion flowing countercurrent to the compressed gases for expansion so that heat exchange is effected. By this means, the attainable temperature of the flue gases upon expansion and regeneration from 3000# to 150# will theoretically be —166° C., but in industrial practice of the apparatus, the most usual attained temperature is —144° C., because of heat loss in the apparatus, depending upon the efficiency of the latter. To do this, the flue gases should be cooled in heat exchanger 114 and expanded at —70° C. This can be readily done and easily attained through the regenerative cycle and the apparatus disclosed. A pressure of 150# is maintained in the expansion chambers 121 and 122 by proper operation of valves 127. Under these conditions, nine-tenths of the carbon dioxide in the flue gases thus expanded flakes out as solid in chambers 121 and 122, the remaining gaseous volume filtering therefrom through pistons composed of parts 132, 133 and 134, to and through the shell of heat exchanger 114 by way of pipes 124 and 125. From the heat of solidification of solid carbon dioxide resulting in the expansion chambers, the gaseous volume filtering and returning therefrom to heat exchanger 114 warms up to approximately —104° C., at which temperature it leaves the expansion chambers and enters heat exchanger 114, exchanging heat with the compressed gases passing through the coil of the latter. These cold gases of expansion flow from heat exchanger 114 to the expansion engine 135 under 150# pressure and at a temperature of 0° C. In expanding in the expansion engine 135 from 150# to atmospheric pressure, the gases of expansion are greatly cooled and discharged into the shell of heat exchanger 98. Being in excess of the cooling needed for the gas flowing through the coil of heat exchanger 98, part of the gases of expansion are not allowed to flow entirely through the shell of heat exchanger 98 to heat exchanger 35 by way of pipe 138, the same being conducted from adjacent the inlet end of the shell of heat exchanger 98 to heat exchanger 35 by way of pipe 139. The gases of expansion pass through heat exchanger 35 to cool the flue gases passing from outlet stack 33 to the compressor 48, thereafter passing by way of pipe 46 to the atmosphere. When sufficient snow has accumulated in chamber 121, the valve 126 of supply pipe 119 is closed, the door 129 of chamber 121 is opened, and the snow discharging piston is drawn outwardly. The door 129 of chamber 121 is then closed and valve 126 of pipe 119 is again opened so that formation of snow in chamber 121 is resumed. While this is occurring, snow is being formed in chamber 122 for similar subsequent removal upon closing valve 126 of pipe 120 and opening door 129 of chamber 122.

By conducting the compressed gas from heat exchanger 98 into receiver 108 prior to passage of the same to heat exchanger 114 at 0° C., any possible remaining saturation condenses out in receiver 108. While 0° C. is the temperature of ice, it is not ample to compensate for the heat of solidification and will consequently not freeze moisture to ice, but will so densify it that condensation takes place. Due to the cubical capacity of receiver 108, the velocity of the compressed gas passing therethrough is slowed down, thus aiding condensation of any saturation that might remain in the compressed flue gases at this point.
The compressed flue gases therefore enter final heat exchanger 114 at about 0° C. and dry to all intents and purposes and as thoroughly as chemical engineering ingenuity has ever been able to effect.
The necessity of maintaining 150# back pressure in the expansion chambers, is to reduce the vapor pressure to one-tenth of an atmosphere for, if no pressure were retained therein, the solid carbon dioxide flaking out would immediately sublime and pass out as gas. By maintaining 150 pounds pressure in the expansion chambers, therefore, the vapor pressure of the solid $CO_2$ is reduced to one-tenth of an atm., and thus 90% of the $CO_2$ in the stack or flue gases is recovered as solid. By passing the gases of expansion through the engine 135, approximately 22 horse power of the work of compression is recovered and converted to electric power, while the gas exhausting from the expansion engine is again cooled to —50° C., and is made available as a cooling medium for heat exchange in heat exchangers 98 and 35. The power generated by generator 136 may be conducted to a light circuit of the plant and to pumps 142, 144, but the latter pump may also be operated from an outside source of power for use when the apparatus is out of operation.

In practice of the apparatus, it is preferred to provide a cooling tower upon the roof of the building 55, and to carry the water upon the roof. An overflow pipe 150 may be provided between the reservoir 140 and the sump 141 through which water upon the roof may return to sump 141 in the event that pump 142 should deliver more water to the reservoir 140 than it should carry. In this manner, the pump 142 needs no watching, and there is a constant equalization of water between the reservoir 140 and the sump 141.

While the apparatus and process are herein exemplified in their preferred specific embodiments, it is nevertheless to be understood that the same are susceptible of many modifications and minor changes without departing from the spirit of the invention as claimed.
What I claim as new is:

1. In an apparatus for producing carbon dioxide, a furnace, means for supplying natural gas and air to and burning the same in said furnace to produce flue gases, means for cooling and partially dehydrating said flue gases, a gasometer having a pressure relief valve, a pump for drawing the flue gases from said cooling and dehydrating means and delivering them under relatively low pressure to said gasometer, a compressor to receive the flue gases from said gasometer, and place them under relatively high compression, said pump having a capacity greater than that of said compressor, a by-pass connection between said gasometer and the inlet of said pump, a normally closed check valve controlling the flow of flue gases through said by-pass connection and adapted to be opened by a pressure less than the maximum delivery pressure of said pump, means in said gasometer for igniting any combustible matter in the flue gases before passing to said compressor, and means for causing ionization of water vapor entrained in the flue gases when passing from the gasometer to the compressor.

2. In an apparatus for producing carbon dioxide, a furnace, means for supplying natural gas and air to and burning the same in said furnace to produce flue gases, means for cooling and partially dehydrating said flue gases, a gasometer having a pressure relief valve, a pump for drawing the flue gases from said cooling and dehydrating means and delivering them under relatively low pressure to said gasometer, a compressor to receive the flue gases from said gasometer and place them under relatively high compression, said pump having a capacity greater than that of said compressor, a by-pass connection between said gasometer and the inlet of said pump, a normally closed check valve controlling the flow of flue gases through said by-pass connection and adapted to be opened by a pressure less than the maximum delivery pressure of said pump, and means in said gasometer for igniting any combustible matter in the flue gases before passing to said compressor.

3. In apparatus for producing carbon dioxide from flue gases, means for burning natural gas with air to produce the flue gases, a compressor for placing the flue gases under pressure, said gas burning means including a furnace having a burner and gas engines for driving the compressor having exhaust pipes, means for supplying the products of combustion from the exhaust pipes of said engines to the burner of said furnace along with additional unburned natural gas and air, and means to inject water into said exhaust pipes of the engines to effect cooling and scrubbing of the products of combustion from said engines prior to passage of the same to the burner of the furnace.

4. In apparatus for producing carbon dioxide from flue gases, means for burning natural gas with air to produce the flue gases, a compressor for placing the flue gases under pressure, said gas burning means including a furnace having a burner and gas engines for driving the compressor having exhaust pipes, means for supplying the products of combustion from the exhaust pipes of said engines to the burner of said furnace along with additional unburned natural gas and air, and means to continuously force the flue gases under a constant low pressure from the furnace to the compressor.

5. In apparatus for producing carbon dioxide from flue gases, means for burning natural gas with air to produce the flue gases, a compressor for placing the flue gases under pressure, said gas burning means including a furnace having a burner and gas engines for driving the compressor having exhaust pipes, means for supplying the products of combustion from the exhaust pipes of said engines to the burner of said furnace along with additional unburned natural gas and air, means to continuously force the flue gases under a constant low pressure from the furnace to the compressor, and means to cause combustion of any combustible matter that might remain in the flue gases after passing from the furnace and before delivery to the compressor.

JOSEPH S. BELT.